United States Patent Office 2,850,403
Patented Sept. 2, 1958

2,850,403

CARBON BLACK PELLETS AND A PROCESS FOR THEIR MANUFACTURE

Jeptha V. Day, Ville Platte, La., assignor to Godfrey L. Cabot, Inc., Boston, Mass., a corporation of Massachusetts No Drawing. Application April 5, 1954
Serial No. 421,181

7 Claims. (Cl. 106—307)

This invention relates to the manufacture of carbon black pellets for use in rubbers, plastics, and rubber-like materials generally and more particularly to pellets having improved structural strength and stability.

As is well known in the art, the agglomeration of the individual particles of colloidal carbon into free-flowing granules can be accomplished by various types of mechanical working and compacting of the dry fluffy black either in the dry state or with the aid of water. Pellets produced by conventional processes, including those employing an ordinary liquid which can be completely evaporated on drying of the pellets, are well adapted for use in rubbery materials because a carbon black thus agglomerated ordinarily shows no loss in its valuable rubber properties. However, such pellets are comparatively weak and when subjected to the turbulent agitation of bulk handling they disintegrate to a considerable extent. Such handling is so severe that usually about 5 to 20% by weight of the pelleted material will be reduced to a particle size finer than 100 mesh. Bulk carriers containing that much dust are very difficult to unload.

Obviously, it is highly desirable to improve the stability of the carbon black pellets sufficiently to avoid this dusting in transit and thus eliminate dust problems entirely. However, it has previously been impossible to increase pellet strength without causing a concomitant impairment in the dispersion and reinforcing qualities of the carbon black in rubber compounds.

It is an object of this invention to provide novel carbon black pellets of unimpaired quality having superior strength and bulk handling characteristics.

Another object is to provide a method of producing stronger carbon black pellets than have heretofore been producible without impairing the quality of the black.

Another object of this invention is to provide a process for producing carbon black pellets which will be substantially non-dusting under normal handling and shipping conditions.

It is also an object of this invention to provide carbon black pellets which are significantly stronger and structurally more stable than conventional pellets but which produce compound rubbers of equally good quality.

It is still another object of this invention to produce such pellets of improved strength by the use of a binder which will be substantially pure carbon in the finished product.

Still other objects and advantages will be apparent from the detailed description of the invention which follows.

I have discovered that vastly improved carbon black pellets can be produced by any convenient wet pelleting procedure when the black undergoing pelletization is wetted with water containing dissolved therein a minor proportion, i. e. not more than about 0.4% by weight of the black being wetted, of a soluble carbohydrate and the wet pellets formed in the process are dried at a temperature and for a period of time sufficient to substantially completely carbonize the carbohydrate. Suitable carbohydrate-containing materials for the purposes of this invention include sugar, molasses, dextrin, soluble starch and the like and in fact may be any simple or complex carbohydrate which is completely, or of which the major proportion is completely soluble in water. Drying of the pellets may be carried out at a temperature between about 400° and 800° F. with the optimum range being about 400° to 600° F.

Preferably, the concentration of the carbohydrate solution will be limited so that the total amount of carbohydrate added is just sufficient to provide the optimum pellet stability consonant with good rubber properties. The maximum amount of carbohydrate which can be used without noticeable effect on the ultimate dispersibility and performance of the black in rubbery media varies with the particular type of carbon black employed and the character (e. g. the viscosity) of the particular rubbery media in which it is designed to be incorporated.

An additional element of the process of this invention is that of drying. The pellets must be dried at temperatures sufficiently high to carbonize the carbohydrate, that is above about 300° F., and preferably in the optimum range of from about 400 to about 600° F. Higher temperatures may be used if desired provided excessive combustion of both black and binder does not occur.

For some types of carbon black, notably the less reinforcing grades such as SRF, the gain in strength and structural stability obtained from increasing the amount of carbohydrate binder above about 0.2% by weight of the dry black is slight and hence is of little practical value for most purposes. For such, therefore, the optimum amount of carbohydrate binder to be used is between about 0.1 and about 0.2% by weight of dry black. Carbon blacks produced from liquid hydrocarbons require slightly more carbohydrate for best results so that the optimum amount of carbohydrate used in the pelletization of such blacks will be about 0.2 to 0.4%. In any event significant improvement in pellet quality results from the addition of as little as 0.1% carbohydrate.

As I have said, the material used as the binder in the present invention can be any carbohydrate type material which will dissolve in water in the concentrations desired, i. e. between 0.1 and 0.4%. This includes all the trisaccharides such as raffinose and materials of similar molecular weight and all the lower molecular saccharides (di- and mono-) such as sucrose, dextrose, arabinose, etc. Some of the polysaccharides of higher molecular weight than the trisaccharides are also readily soluble in the small concentrations necessary for the practice of this invention. These include dextrins, starches (especially hydrolyzed starch or soluble starch), and cellulose degradation products and similar materials. The very high molecular saccharides which are insoluble or form only colloidal solutions of high viscosity at relatively low concentrations, such as the hemi-celluloses and the gums, are not suitable for use as the sole binding agent in this invention because it is difficult to distribute them uniformly over the finely-divided carbon black.

The carbohydrate material used in the practice of this invention need not be pure carbohydrate and complex mixtures of carbohydrate materials composed predominately of readily water-soluble carbohydrates but containing some higher molecular colloidally soluble materials are quite acceptable provided the total concentration of carbohydrate required in the solution to be used is maintained below about 0.4%. In fact, for commercial operations crude mixtures of carbohydrates and carbohydrate extracts obtained as by-products or recovered from wastes represent an ideal source of binder for use in the process of this invention. For example, there are various impure sugar syrups available at low cost including blackstrap molasses from sugar refining, Curbay and similar residues from alcohol fermentation, citrus molasses from citrus wastes, and wood molasses from the hydrolysis of wood wastes. Some carbohydrate-like extracts obtained from the non-cellulosic portions of wood, such as raw lignin extracts, are also useful as binders in the practice of this invention. While very impure sources of the carbohydrate binder can be used, it is preferable to hold the content of ash, or any fraction which will not be reduced to carbon at the temperatures used in drying, to as low a level as possible.

Specific embodiments of this invention are described in the following examples. These examples are merely illustrative, however, and should not be considered as implying any limitation in the scope of my invention.

*Example 1*

Sterling SRF, a semi-reinforcing furnace black having a surface area of around 25 sq. meters per gram as measured by nitrogen adsorption, was collected from the production unit and fed in the fluffy state to one end of a pin-type pelletizer of the type described in U. S. Patent No. 2,306,698, Heller and Snow. As the black entered the drum it was wetted by a finely-divided spray of water containing black strap molasses in solution in an amount sufficient to deliver 0.2% carbohydrate by weight of the black to the black. The pellets formed in this way were dried at about 400° F.

These pellets were compared by means of the Western Electric bulk handling and Goodyear Ro-Tap dusting tests for structural strength and ability to resist disintegration by rough handling with a batch of conventional wet pellets made under similar conditions in the same apparatus except that the water contained no additive.

For the Western Electric test, there is provided a section of 2-inch pipe open at the upper end which is filled with pellets to a measured height. A piston, weighted by estimation of the probable end point of just sufficiently less diameter than the inside diameter of the pipe to permit it to slide freely therein is inserted to rest on top of the pellet bed. The pipe is then tapped or shaken until the plunger settles about ¼ to ⅜ inch and the plunger is removed. The pipe is now quietly lifted from its base to leave the bottom end open. If all of the black fails to fall out of the pipe the end point has been reached. However, if no black remains in the pipe additional samples of black are tested with increasingly heavy weights until the end point has been reached. The result is recorded as the weight required to cause retention of black in the pipe.

In the Goodyear Ro-Tap test a weighed sample of carbon black pellets is subjected to 20 minutes shaking and vibration in a Ro-Tap shaker, a device consisting of a series of superimposed screens of downwardly decreasing mesh size, with the bottom screen being a 100-mesh Tyler, having a cover on the top screen, a closed pan below the bottom screen and a motor drive which causes the entire stack of screens to gyrate in a rotary horizontal motion while bouncing simultaneously in a vertical up and down motion. The amount of fines recovered in the bottom pan at the end of the test is measured and reported as percentage by weight of pelleted black originally charged to the shaker. Since the pelleted material initially charged is almost free of such fines, this figure represents the proportion of the pellets which have been broken up and reduced to dust by this bouncing vibration and shaking action.

The results obtained from tests on pellets from the above example were as follows:

| | 0.2% carbohydrate bound pellets (av. of 5 test runs) | Conventional wet process pellets (av. of 3 test runs) |
|---|---|---|
| Western Electric crushing strength__pounds__ | 48 | 18 |
| Apparent density of pelleted material (after drying)_____lbs./cu. ft__ | 29.6 | 27.7 |
| −100 mesh fraction from 20′ Ro-Tap_percent__ | 2.2 | 23.9 |

These results demonstrate the tremendous increase in pellet strength and resistance to dusting effected by the addition of only 0.2% by weight of a crude carbohydrate to the pelletizing water.

Samples of these same pellets were compounded into standard test formulae natural and synthetic rubber stocks using conventional Banbury equipment and normal milling times. Standard tests on the resulting rubbers cured 60 minutes at 292° F. gave the following results.

(A) Using 50 parts black to 100 parts natural rubber:

| | 0.2% carbohydrate bound pellets | Conventional wet process pellets |
|---|---|---|
| Modulus at 300% elongation (#/sq. in.)_____ | 1,590 | 1,650 |
| Modulus at 400% elongation (#/sq. in.)_____ | 2,390 | 2,430 |
| Tensile (#/sq. in.)_____ | 3,340 | 3,400 |
| Elongation, percent_____ | 520 | 520 |
| Shore hardness_____ | 65 | 65 |

(B) Using 50 parts black to 100 parts GR–S (butadiene-styrene copolymer):

| | 0.2% carbohydrate bound pellets | Conventional wet process pellets |
|---|---|---|
| Modulus at 300% elongation (#/sq. in.)_____ | 920 | 900 |
| Modulus at 400% elongation (#/sq. in.)_____ | 1,370 | 1,360 |
| Tensile (#/sq. in.)_____ | 2,180 | 2,180 |
| Elongation, percent_____ | 600 | 600 |
| Shore hardness_____ | 57 | 57 |

*Example 2*

Example 1 was repeated except that sufficient molasses was added to the water to provide a carbohydrate content of about 0.4% of the dry black. In this case the pellets were dried at about 400° F. These pellets were compared with conventional wet process pellets as in the previous example.

The results obtained from testing these pellets were as follows, each value shown representing the average of four separate tests.

| | 0.4% carbohydrate bound pellets | Conventional wet process pellets |
|---|---|---|
| Western Electric crushing strength__pounds__ | 60 | 22 |
| Apparent density of pelleted material (after drying)_____lbs./cu. ft__ | 29.4 | 29 |
| −100 mesh fraction from 20′ Ro-Tap_percent__ | 2.0 | 10.9 |

Here again we see a tremendous increase in pellet strength and reduction in dust forming tendency for the pellets of my invention.

As before, the rubber reinforcing properties of both types of pellets were tested in both natural and synthetic (GR–S) formulations cured 60 minutes at 292° F. with the following results.

(A) Using 50 parts black to 100 parts natural rubber:

| | 0.4% carbohydrate bound pellets | Conventional wet process pellets |
|---|---|---|
| Modulus at 300% elongation (#/sq. in.)_____ | 1,560 | 1,540 |
| Modulus at 400% elongation (#/sq. in.)_____ | 2,350 | 2,350 |
| Tensile (#/sq. in.)_____ | 3,270 | 3,400 |
| Elongation, percent_____ | 530 | 520 |
| Shore hardness_____ | 64 | 64 |

(B) Using 50 parts black to 100 parts GR–S:

|  | 0.4% carbohydrate bound pellets | Conventional wet process pellets |
| --- | --- | --- |
| Modulus at 300% elongation (#/sq. in.) | 850 | 900 |
| Modulus at 400% elongation (#/sq. in.) | 1,270 | 1,380 |
| Tensile (#/sq. in.) | 2,210 | 2,260 |
| Elongation, percent | 610 | 610 |
| Shore hardness | 57 | 57 |

Again we find no indication of a significant loss in valuable rubber properties of the black as a result of the carbohydrate addition to the pellets except for the insignificant drop of about 5% in modulus of the GR–S compound. In the face of the remarkable increase in strength and reduction in dusting tendency of the carbohydrate bound pellets, it is considered very surprising that the desirable rubber properties of the black are maintained so well.

This unusual and exceptionally desirable behavior of the carbohydrate bound pellets of this invention is apparently due to their unique physical structure which differs to an important degree from that of any pellet produced by prior known processes. The pellets of my invention have a harder and more polished exterior and are smoother and freer of dust than conventional pellets. However, this hard shiny exterior layer is relatively thin and encloses a soft formless interior which appears to be like that of any wet process pellet and is equally as dispersible. The pellets of this invention are more readily wetted than previously known pellets and if water is allowed to soak gently into them the exterior shells readily rupture, spilling out the loose contents from within. The density of these pellets is very little greater than that of ordinary wet pellets.

I have been unable to find any trace of sugar in the carbohydrate bound pellets of my invention provided they have been sufficiently dried. Apparently, the carbohydrate is charred sufficiently for reduction to substantially pure carbon. This means that more than 99% of weight of the finished pellet is composed of the original fluffy carbon black treated, since the total amount of carbohydrate material introduced does not exceed about 0.4% of the weight of dry fluffy black.

I have found that the maximum amount of carbohydrate which can be introduced is extremely critical if pellets having the desirable combination of properties illustrated in the above examples are to be obtained. This critical upper limit on the amount of carbohydrate which can be used appears to be about 0.4% because, above this level, rubber properties of the black are reduced to values unacceptable for most purposes. For the SRF pellets described in the above examples optimum pellet strength appears to be achieved at below the 0.2% carbohydrate level and since pellet quality is not materially improved above this level there is no advantage in using greater amounts of carbohydrate on blacks of similar low surface area. However, for channel and high abrasion furnace blacks having considerably smaller average particle size and greater surface areas, higher concentrations of carbohydrate, e. g. up to 0.4%, may be necessary to reach the point of maximum pellet strength and/or optimum rubber properties.

The beneficial results of the present invention are all the more astonishing because it has previously been considered impossible to use a binding agent in a carbon black pellet without destroying its utility as a filler for rubber and plastics. The literature is replete with statements that the black will be rendered hard and nondispersible by the use of such binders even though the organic residue of the binder is decomposed. Pellet quality may be improved by the use of wetting agents in the pelletizing water but its presence has a degrading effect upon rubber compounds. In any event the improvement in pellet quality from the use of wetting agents is negligible, particularly as compared with the pellets of this invention. Moreover, by the present process not only are the strength and the stability of the pellets greatly increased, but this is accomplished without the retention of non-carbon foreign matter in the finished pellets and without damaging the dispersibility of the carbon black or its capacity for reinforcing rubbers and plastics.

Having thus described my invention, I claim:

1. A process for producing essentially carbon black pellets of greatly enhanced strength and nondusting qualities which comprises agitating the black while spraying on the surface thereof water containing a carbohydrate material dissolved therein in an amount sufficient to deposit on the black an amount of such carbohydrate equal to between about 0.1 to 0.4% of the black by weight, forming pellets thereof, and drying the pellets sufficiently to evaporate substantially all the water therefrom and to substantially completely carbonize the carbohydrate admixed therewith.

2. The process of claim 1 further characterized by drying the pellets at a temperature of between about 300° and 800° F.

3. The process of claim 1 in which the carbohydrate material is selected from the group consisting of sugar, molasses, dextrin, soluble starch, soluble saccharide and cellulose degradation products, and mixtures thereof.

4. A process for producing essentially carbon black pellets comprising agitating the black while spraying on the surface thereof water containing a compatible material having a substantial carbohydrate content dissolved therein in an amount sufficient to deposit on the black a 100% carbohydrate equivalent equal to between about 0.1 and 0.4% of the weight of the black, forming pellets thereof and drying the pellets under conditions such that substantially all of the carbohydrate admixed therewith will be converted to carbon and substantially all of the water will be evaporated therefrom.

5. Essentially carbon black pellets having deposited within the interstices thereof and thereon carbon in an amount equal to about 0.1–0.4% of the weight of the black produced by spraying a carbohydrate material dissolved in water onto the carbon black during pelletization thereof and drying the pellets thereby produced sufficiently to evaporate substantially all of the water therefrom and to substantially completely carbonize the carbohydrate admixed therewith.

6. Essentially carbon black pellets containing as a binder a carbonized carbohydrate produced by agitating carbon black while spraying on the surface thereof an aqueous solution of a carbohydrate material in an amount sufficient to deposit on the black an amount of such carbohydrate equal to between about 0.1% and 0.4% of the black by weight, forming pellets thereof and drying the pellets sufficiently to evaporate substantially all the water therefrom and to substantially completely carbonize the carbohydrate admixed therewith.

7. The pellets as defined in claim 6 further characterized by the carbohydrate material being selected from the group consisting of sugar, molasses, dextrin, soluble starch, soluble saccharide and cellulose degradation products, and mixtures thereof.

References Cited in the file of this patent

UNITED STATES PATENTS

| 419,163 | Wass | Jan. 7, 1890 |
| 1,286,024 | Knowlton | Nov. 26, 1918 |
| 2,040,770 | Grote | May 12, 1936 |
| 2,427,238 | Swart | Sept. 9, 1947 |
| 2,457,962 | Whaley | Jan. 4, 1949 |
| 2,639,225 | Venuto | May 19, 1953 |
| 2,719,779 | Bray | Oct. 4, 1955 |